Patented May 9, 1944

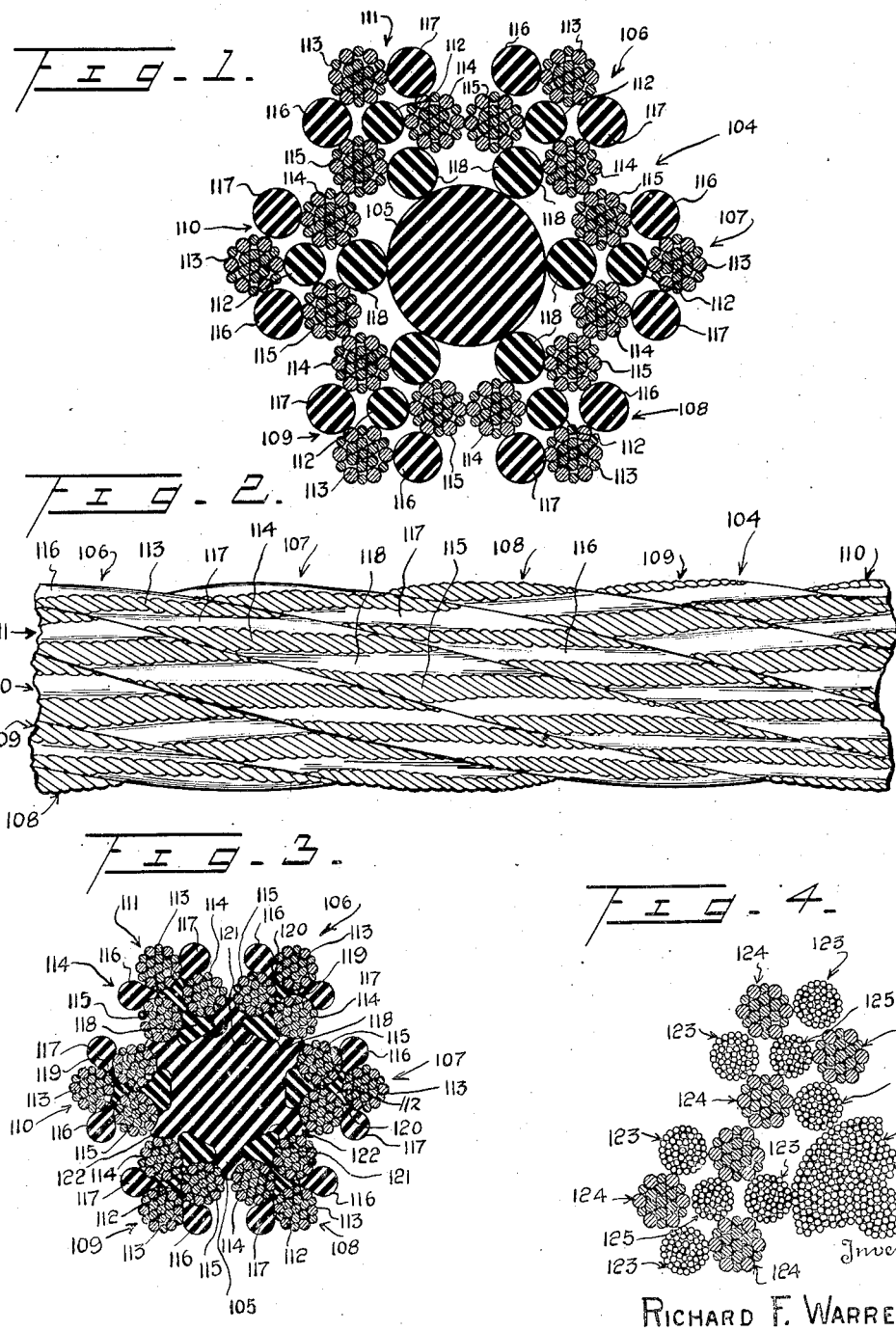
May 9, 1944.   R. F. WARREN, JR   2,348,234
FLEXIBLE COMPOSITE ROPE
Original Filed June 19, 1940
Inventor
RICHARD F. WARREN, JR.

2,348,234

UNITED STATES PATENT OFFICE 2,348,234

FLEXIBLE COMPOSITE ROPE

Richard F. Warren, Jr., Stratford, Conn.

Original application June 19, 1940, Serial No. 341,352. Divided and this application September 3, 1942, Serial No. 457,197

21 Claims. (Cl. 57—147)

This invention relates to new and useful improvements in ropes and has particular relation to a rope characterized by tensile strength and flexibility.

The objects and advantages of the invention will become apparent from a consideration of the following detailed description taken in connection with the accompanying drawing wherein satisfactory embodiments of the invention are shown. However, it is to be understood that the invention is not limited to the details disclosed but includes all such variations and modifications as fall within the spirit of the invention and the scope of the appended claims.

In the drawing:

Fig. 1 is an enlarged schematic view showing the relation of the various cores and strands of a rope in the relations they would occupy if all were assembled prior to the laying of the strands into the rope;

Fig. 2 is an enlarged side elevational view of a short section of rope made in accordance with the invention;

Fig. 3 is a slightly enlarged transverse sectional view through the finished rope of Fig. 2; and Fig. 4 is a view similar to Fig. 1 but showing a slight modification.

The present application is a division of my application Serial Number 341,352, filed June 19, 1940.

The rope of the invention is especially designed for use in the mooring of ships and in other work wherein a rope of great strength and flexibility is desired. Further the rope of the invention is particularly desirable for use in connections where a rope is likely to be frequently wet, must be handled, bent about poles and the like. Due to its flexibility the rope of the invention allows for manual handling and gives ease of storage and requires relatively little storage room when coiled.

In addition to the mentioned features the rope of the invention has the characteristic of stretchability which is particularly valuable when the rope is used as a tow rope as the rope is so characterized that it gradually takes up a load. This feature is a result of the material used in making the rope and from the structure of the rope. Further due to the increased strength of the material used in my present ropes over materials formerly used in ropes I am enabled to make a rope of less diameter but having the tensile strength of former ropes of greater diameter.

Ropes used about water frequently become wet as from exposure or immersion and the rope of the invention is particularly adapted for withstanding moisture either when exposed to moist air or when actually submerged. My rope in addition to containing metal wire or metal strands includes non-metallic plastic strands in the form of single or multiple elements which are water-proof in themselves or have been made water-proof and which rapidly shed water following immersion.

Thus my rope includes portions of materials (to be disclosed herein) to which water will not have a chance to freeze. Preferably any metal elements in the rope are coated or covered with the suggested materials, whereby all elements of the rope will rapidly shed water. Therefore, should the rope of the invention be repeatedly submerged each time it is withdrawn from the water it will rapidly shed the latter and consequently the rope will never become solidly coated with ice and will not become rigid. Should the rope include uncovered metallic portions and should the latter become coated with ice the rope will not be rigid since the ice will not form on the non-metallic elements used and so when the rope is next flexed (or vibrated in the case of standing rigging) with ice on certain of the elements such ice will be easily broken from such elements.

Referring in detail to the drawing and at first more particularly to Figs. 1, 2 and 3 a rope generally designated 104 is shown as including a vinylidene chloride core or center 105 about which are laid or twisted a series of major strands designated generally 106, 107, 108, 109, 110 and 111. Each major strand as shown includes a core 112 of vinylidene chloride and six minor strands of which those designated 113, 114 and 115 are metallic elements or strands each comprising a series of wires laid together. The minor strands designated 116, 117 and 118 are each in the form of a single bar-like element of vinylidene chloride although as will appear other plastics may be used for such strands and for the cores 105 and 112.

It is noted in Fig. 1 that the cores 105 and 112 as well as the elements and strands of the various major strands are all circular in transverse section prior to the beginning of the twisting or laying operations. The minor strands 116, 117 and 118 are arranged alternately with the minor strands 113, 114 and 115. After the minor strands to make a major strand (i. e. any of the strands 106, 107, 108, 109, 110 and 111) are arranged in the alternate relation they are twisted or laid together to form the major strand. As will later appear the elements and the major and minor strands are preformed into the proper helices before laying into a rope.

The twisting or laying of the minor strands into the major strands results in deforming of the cores 112 as the minor strands are twisted together and drawn toward one another and against the cores. In Fig. 3 it will be noted that the cores 112 have been deformed into substantially triangular shapes and completely fill the spaces between the inner sides of the minor metal strands 113, 114 and 115. Further as the major strands are made the non-metallic minor strands 116, 117 and 118 are deformed as their inner portions are squeezed between pairs of the adjacent metal minor strands.

Thus in Fig. 3 it is noted that the inner portions of the minor strands 116, 117 and 118 are crushed providing narrow portions 119 abutting similar portions 120 of the deformed cores 112, said portions 120 comprising the apices of the deformed cores. From this it will be clear that the deformed cores together with the deformed portions of the minor strands 116, 117 and 118 completely fill the spaces about the inner portions of the minor metal strands of the respective major strands.

The inner non-metallic (vinylidene chloride) minor strands 118 of the respective major strands are laid against the main core 105 and in the main rope laying or twisting operation such minor strands flatten somewhat on their outer sides as at 121 and while they are somewhat deformed about the inner sides of the minor wire strands 114 and 115, they are also slightly embedded in the main core 105. This latter core is so deformed in the laying operation that it partly envelopes the flattened portions 121 and deforms about the inner portions of the minor metal strands 114 and 115 and enters partly between the minor metal strands of one major strand and the adjacent minor metal strands of the next major strand. Thus in Fig. 2 the core 105 has portions 122 of wedge shape partly entering between the minor strand 114 of major strand 106 and the minor strand 115 of the major strand 107; the minor strand 114 of major strand 107 and the minor strand 115 of the major strand 108, etc.

Referring now to Fig. 4 the rope there shown is of substantially the same construction as that already described with the exception that the vinylidene chloride minor strands 123 of the modified construction are made from a plurality of elements and that the main cable core is of modified construction. Minor strands 123 are each made up of a plurality of threads, filaments or elements of a chosen diameter and all of which may be of the same diameter or otherwise as desired. Such minor strands 123 are arranged to alternate with the minor metallic strands 124 made up of wires and while in the drawing three of each kind of minor strands are shown, as together with a core 125 making up a major strand, it will be understood that this is for the purpose of illustration since the number of strands does not constitute a limitation of the invention.

Preferably the core 125 is of the material of the minor strands 123 and it is noted that such core is made up of a plurality of threads or elements as is the main rope core 126, both cores being of the material of or similar to that of the minor strands 123. The construction wherein the cores and non-metallic minor strands are made up of a plurality of threads or elements provides for greater flexibility and strength in the rope. This is true since the threads or elements are of plastic material and have smooth surfaces whereby the threads readily slide on one another. Also the elements may be lubricated and where macro-molecular structures are used the elements are resilient to provide for flexing and bending.

The stiffness of the rope may be controlled by predetermining the diameters of the filaments and wires as well as of the strands and further the stiffness of the rope may be determined by the amount of orientation which has taken place in the plastic filaments. In the same strand filaments of different diameters may be used.

While in connection with the disclosed embodiments of the invention the various non-metallic strands and cores have been described as of vinylidene chloride it is to be understood that such material is the plastic preferred in the making of my improved ropes. As will later appear certain plastics other than vinylidene chloride may be used in the making of the rope of the invention. Further it is to be understood that the physical embodiments of the elements and cores may be varied from those shown within the scope of the invention.

In making the present rope each of the elements (metallic and non-metallic) is preformed or formed on a helix whereby the elements in a strand interfit with one another without stress. Thus should any element become broken the ends of such element will not have a tendency to spread outwardly of the zone of the body of the strand and will resist unstranding and thus remain in place giving something to the strength of the assembly. This same preforming operation is carried out in connection with the strands made of the preformed filaments or elements whereby the strands being formed into helices will lie in an unstressed neutral condition in the ropes.

This is of importance in the present construction since the ropes of the invention are handled and with the preformed elements, strands and ropes there will be little danger of any element breaking and then projecting from the rope in a manner to pierce or cut the hand of a person concerned with the use of the rope. The preformed construction has little internal stress and therefore, ropes made as described will lie in a flat or straight condition with no real tendency to snarl or twist. When the ropes are to be cut it is not necessary to seize the ends as they will not unlay. Also such ropes have longer life when run on sheaves; they are easier to splice; resist rotating in grooves; spool or coil perfectly and resist whipping.

Generally speaking the non-metallic strands or elements and cores comprise organic plastic materials or certain inorganic natural plastic materials as glass fibres, quartz fibres, or Bentonite (in the form known as Alsifilm) although asbestos has been found useful for my present purpose. Certain of the organic plastics may be used alone and others only in combination with a second or even a third to make a harder or softer material or mixture.

The non-metallic filaments and cores of the rope of the invention may be of any of various plastics and such plastics include synthetic resins, natural and synthetic lastics, cellulose (as ethyl cellulose) and its derivatives, protein plastic substances (as nylon), and petroleum plastic derivatives. There are several chemical types of synthetic resins such as (1) phenol-aldehydic resins, (2) amino-aldehydic resins, (3) hydroxycarboxylic resins, (4) sulphonamide resins, (5) resins from sugar, (6) vinyl resins including resins from vinyl derivatives, (7) indene resins and (8) lignin plastic substances. The polymerization resins and particularly the vinyls and vinyl derivatives are preferred for my purpose.

Under the type (1). may be included resins such as phenol formaldehyde, cresol and cresylic acid, other tar acids and formaldehydes, phenol furfuraldehyde or other tar acids and other aldehydes. Under type (2) is included urea and formaldehyde resins, and aniline resins obtained by condensing aniline and formaldehyde and other anilines or amines and other aldehydes.

Under type (3) I include materials produced by the esterification of polybasic acids with polyhydric alcohols. Such materials are frequently called alkyd resins, this title including adipic acid resins obtained by the condensation of adipic acid and glycerin or by the condensation of glycerin with phthalic anhydride. Type (4) includes the sulphonamide resins developed from para toluenesulphonamide. The resins from sugar, type (5) above, are obtained by condensing saccharine with aldehydes and urea.

Vinylidene chloride (sold commercially as Venalloy) is included in the group of vinyl resins (type 6) including resins from vinyl derivatives and such group also comprehends vinyl ester, vinyl butyrate, vinyl chloride, acrylic resins from vinylcarbonic acid ester, vinyl carbonic acid, vinyl benzole of polystyrol, divinyl or butadiene, vinyl ester or vinyl chloride, copolymerized polyvinyl chloride and polyvinyl acetate (known commercially as Vinylite), vinyl acetate, polymers of vinyl halides combined with different percentages of plasticizers (known commercially as Koroseal) the commercial article known as Vistanex and comprising polyiso butylene polymerized with boron trifluoride and also comprising polyiso butadiene having a tacky to rubber-like structure, the commercial products known as Vinyon (a copolymer of polyvinyl chloride and polyvinyl acetate), Butacite (a reaction product of vinyl acetate resin with butyraldehyde), and Rezel (resulting from the fact that the introduction of an unsaturated resinous ester of the maleate polyester type into a compound of the type (R—CH=CH$_2$) has the property of curing the latter), the polymer of ester of acrylic acid known commercially as Plexigum, polymers of the esters of methacrylic acids such as the polymethacrylic resin sold as Lucite and Plexiglass, isobutyl methacrylic resins, certain plastic obtained by mixing the monomer of styrene with vinylidene chloride and with ethylene glycol and maleic acid and copolymerizing the mixture, styrene and in addition thereto the resin known as polystyrene.

Resins of the indene group (type 7) include polyindene and poly-cumaron. Under type (8) I include lignin and its derivatives extracted from paper mill waste waters and other sources. The lignin may be separated into various chemical components of no value to me here but also into colored gums and by various treatments into clear transparent resins useful for my present purpose. Lignin is hydrogenated with Raney nickel catalyst, in aqueous solution yielding methanol, propylcyclohexane, hydroxy propylcyclohexanes, and a colorless resin which may again be separated into an alkali soluble and an alkali insoluble component. I use either of these components in the production of resins to be used in the making of ropes.

Under the heading of natural and synthetic lastics, I include as natural lastics—balata, rubber, gutta percha and latex to be used alone or as a coating or processed or compounded with other materials. As the synthetic lastics I mention polymerized chloroprene (of the type now sold as neoprene); polymerized butadiene (of the type sold as Buna or Perbunan); polymethylene polysulphide (of the type sold as Thiokol); chlorinated rubber (of the type sold as Tornesit); rubber hydrochloride (of the type sold as Pliofilm); and isomerized rubber (of the type sold as Pliform) and any latex of these. Also sulphonated rubber or synthetic sulphonates to promote wire adhesion.

Certain materials sometimes called synthetic lastics I prefer to include under the heading of vinyl derivatives. For example, it appears that the polymerized vinyl derivative known commercially as Vistanex (polyiso butylene and polyiso butadiene) might be included under either group. Such material is used in the present instance when mixed with other materials and has certain lubricating properties of value in the making of ropes.

Under the heading of cellulose and its derivatives I include cellulose acetate; regenerated cellulose; cellulose xanthate; benzylcellulose; ethylcellulose; cellulose hydrate; cellulose triacetate; cellulose acetobutyrate; cellulose acetopropionate; hydrolysed cellulose acetate and others of the cellulose esters and ethers. Railan a rayon thread made from cellulose extracted from sugar cane may also be used. Most of these materials can be used alone for my purpose in the making of ropes and can be used in the form of filaments or may be cut to strips from sheets and then the strips twisted into filaments. Also certain of these materials may be used with other materials herein mentioned for the purpose of toughening the latter.

Nitrocellulose compounded with other materials of a less flammable nature or of a nature to prevent flammability, may be used. Halowax or the like may be used for compounding with nitrocellulose and it is noted that the latter is so far as cost, strength and the like are concerned, a desirable material for my purpose. Other noninflammable plasticizers which may be compounded with nitrocellulose for my purpose are monophenyl phosphate and di (paratertiary butyl phenyl) mono 15 tertiary butyl 2 xenyl phosphate. The flammable nature of nitrocellulose may be weakened or lessened by mixing with varying proportions of cellulose acetate. Under this class may also be included gel cellulose which may be used for my purpose. This material may be used as a filler with other materials herein mentioned.

Under the heading of protein plastic substances, I include casein preferably in the fibrous form sold as Lactofil and Lanital made by either the wet or dry process. The material sold as zein, and which comprises a raw material in the form of a powder, may by extrusion or the like be converted into fibres for use here. Polypentamethylene sebacamide sold as nylon may also be used. Regenerated silk made by reducing waste silk and waste cocoons containing silk and then forming it into threads or sheets to be cut to strips, is also believed to fall under the present heading.

That group of compounds of which at least one is obtained by condensation polymerization from a diamine and a dibasic carboxylic acid and of which one is now sold under the trade-mark Exton is very useful for my present purpose.

Another protein plastic which may be used is obtained by extracting the protein from the refuse remaining after the oil has been extracted from soy beans, oiticica nuts, and other protein bearing substances. The extracted protein is properly reacted to form plastic substances. Here it is noted that oiticica oil may be used as a plasticizer with styrene to make the latter more suitable for my purpose.

Collagen plastics are another protein substance suitable for my purpose. Such plastics are fibrous. The collagen may be recovered from the waste from tanneries or otherwise. Various resins from coffee may also be used.

The petroleum plastic derivatives include those gums or resins obtained by the oxidation or controlled polymerization of certain distillates or petroleum cracking. Thus I may use the commercially known "Santoresins" produced by this method as well as "Petropol" which is a softer type of the same material. These materials are, when used for my purpose, to be mixed with other materials listed above whereby the resultant mass may be shaped by extruding or the like to provide threads or sheets of materials having desired characteristics. Propane precipitated resins from distillation of crude petroleum may also be used to advantage as an assistant to produce heat penetration to materials like vinylidene chloride and retain stability.

Also cracking coal tar resins of high aromatic content and condensing them with formaldehyde or other aldehydes forms resins useful for my purpose. Similarly, I may use heavier petroleum products cracked and then condensed with formaldehyde or other aldehydes, hydrogenated or chlorinated either at elevated temperatures or by the addition of metallic halides. For use as rope cores comprising large diameter bars and the like, the materials are advantageous. The natural inorganic materials above mentioned may be used in the place of the organic plastics in certain instances. The glass or the quartz must be made plastic by heat and then it is spun or extruded and oriented in fibres and the latter are brought together to form strands or cores as the case may be.

Plastics comprising nitrogenous condensation products are also suitable for use in the making of various rope elements of the invention. One such plastic is now on the market under the name "Nulamine."

Preferably when glass, fused quartz or other materials which may be made into fibres of great tensile strength are used as a material in the making of ropes, it is incorporated into strands or cores or other elements and such elements may be solid one piece or they may be made up of a number of separate elements or filaments. The filaments, strands and/or cores comprise a plastic or a combination of plastics having the inorganic fibres embedded therein or otherwise separated thereby and oriented to extend in the direction of the length of the strands or cores.

Thus, in such a construction the glass or quartz fibres to as large an extent as possible or as is feasible, are oriented and also each fibre coated with a plastic or otherwise spaced from the adjacent fibres by a cushioning plastic, so that the fibres are maintained from contact with one another. The fibres are oriented before incorporation in the cushioning plastic. The presence of these oriented fibres very greatly increases the tensile strength of the filaments or cores and thus of the ropes into which they may be incorporated.

Bentonite, in especially pure form, may be mixed with water to form a gel. The gel is evaporated and the particles draw toward one another and become permanently fixed, by their attraction for one another, in strings or tiny fibrils. These mat together to form a tough coherent film. The bentonite may be extruded in the form of filaments or after being formed into sheets may be cut into strips and the latter twisted into filaments, such filaments to be used as above in the formation of strands or cores. Stressing of these gels produces orientation desirable for strength.

Under the general heading of asbestos, I include the fibrous varieties of the mineral amphibole, the fibrous forms of pyroxene, the mineral crocidolite of the amphibole group and also chrysotile. The principal varieties of asbestos are anthophyllite, amphibole and serpentine. Asbestos floats of any variety may be used as fillers while the longer fibres may be made into filaments for strands or cores.

Various combinations of the materials disclosed may be used for the purpose of regulating resiliency, stiffness, bacteria growth, fungus growth, water-proofness, controlling the melting or softening point, control of strength factors, as elasticity, tensile and shear strength, aiding in lubrication and the like. Many of the materials disclosed herein and which are chemically incompatible with one another are mechanically miscible to form a homogeneous mass adapted to be fabricated into filaments, sheets and strips to be made into ropes meeting any of the above requirements as to combinations of physical and chemical characteristics.

Thus materials which may not be used alone for my purpose by reason of being too brittle, etc., may be mixed with other materials and in that way utilized for the characteristics they impart. For example, those resins identified above as (1), (2), (4), (5), (7), (8) along with the coal tar resins are used with other materials, as Vistanex, to limit or eliminate cold flow or for the other characteristics they may impart but they are not used alone in the present instance.

Formaldehyde and urea resins as well as any chlorinated material (certain synthetic lastics) have germicidal properties and when used with other materials included herein serve to prevent or arrest bacteria growth and thus decomposition of the filaments due to biochemical attack. Whether the action of said materials merely arrests bacteria growth or completely eliminates bacteria will depend on the materials and quantities used.

The various filaments (whether bundles of fine filaments or single bar-like elements of considerable diameter are employed) are oriented. Where preformed structures are employed it is preferred that the molecules of the filaments be oriented in a direction parallel to the axial centers of the filaments. That is, the molecules are oriented in a direction parallel to the center of a helical line (the longitudinal center line of the filaments) rather than the parallel relation to a straight line. This is accomplished by stretching the material through a helical die while hot or drawing it over the preform rolls of a rope machine. Thus in my preformed strands or filaments I avoid obstinate internal stresses which cause a wildness of fibre. The strands, cores or ropes made of the filaments oriented as described will have increased tensile strength and extra resistance to twisting and bending, and will lay in a rope without opposing stresses tending to open the rope.

In orienting the filaments (whether thread-like or bar-like) they are reduced to the desired diameters by repeated small reductions obtained by drawing through successively smaller dies or by repeated stretching. Such reductions take place while the material is in a ductile condition. The performing and orienting operations may be simultaneously accomplished.

In making the filaments of twisted strips rather than by extrusion the sheets from which the strips are to be taken are reduced to the desired thickness by repeated small reductions rather than by a single large reduction. These reductions take place while the material is heated or wetted (depending on the material being used). The finished sheets are cut to strips and the latter twisted into filaments for use in cores or the like.

Preferably the strips are cut from the sheet in such manner as to have the direction of the length of the flow of the material of the sheet represent the longitudinal axis of the strips. Thereafter as the strips are twisted they are heated or wetted (depending on the material concerned) and are stretched whereby to further orient the molecules to have the latter oriented in the direction of the length of the twisted strip and on a bias with respect to that which was the longitudinal axis of the strip prior to the twisting thereof.

Vinylidene chloride, and to some extent the other vinyl compounds mentioned herein, is to a large degree self-lubricating. However, lubricants may be added to or provided in the present rope as desired and preferably as disclosed in my copending application (Serial Number 47,198 filed September 3, 1942) directed to lubrication of ropes and also comprising a division of the same parent case as the present application.

In the present rope only the alternate strands are of metal and thus the metal strands or elements are prevented from working against one another as the rope is subjected to strains and bends during use. Therefore one metallic strand or element may not wear or cut another such strand or element. Also as the metal strands or elements in the finished rope are partly embedded in the non-metallic strands or elements and the latter are somewhat self lubricating it will be understood that the rope of the invention in addition to being highly flexible will have long useful life.

The various strands, elements and cores of the rope being formed by extrusion or of extruded elements or filaments or of otherwise artificially formed filaments are of uniform diameter throughout their lengths. Of the plastics mentioned herein those sold as Venalloy and Vinyon seem best suited for my purpose. Such materials are waterproof, bacteria and germ proof, have the desired modulus of elasticity, tensile, abrasive and flexural strength. In addition they are resilient for my purpose, are acid, oil, and alkali resistant, will not oxidize, are not adversely affected by sun or other light rays and have exceptionally few solvents. These vinyl derivatives are for the most part resistant to corrosive halides such as chlorine and bromine and also mustard gas. Further these materials are permanently waterproof and are not affected by bacteria and will not support fungus growth and so are not subject to decay through biochemical attack and are non-inflammable. However Vinyon is not as desirable as Venalloy as the former requires the use of plasticizers which dissipate in time making the material very brittle.

When made fluid by heat vinylidene chloride catalyses on contact with certain metals including copper, iron and steel. This catalyzing may be avoided by mixing with the vinylidene chloride some material raising its melting point of the vinylidene so that it may be used in a softened state but not as a fluid for coating metal elements or strands of the rope to have the latter water-proof, etc. The catalyzing of the vinylidene chloride when coating certain metals may also be avoided if the metals to be coated are first coated or plated with a non-catalyzing metal as nickel or magnesium, or oiticica oil varnish, etc.

Vinylidene chloride when stretched to the point of most yield returns approximately ten percent and stops. Thereafter it has the property of a fixed stretchability of approximately ten percent. The original stretching must be accomplished shortly after extrusion or thereafter the material must be soaked in heat to cause it to return to random orientation. Plastic strands of this material having a fixed amount of stretch and return provide a rope which gradually takes up a load. The stretch in the plastic strands and cores is matched, or approximately so, by straightening of the metal elements and the cutting or squeezing of the latter into the non-metallic vinylidene chloride elements or cores. The rope returns to normal on being relieved of its load. The initial part of the limit of stretch of the rope is easily obtained and as the rope elongates each succeeding degree of elongation requires a greater or increased load.

To prevent the formation of glossy surfaces whereby the filaments of plastics will frictionally engage one another and therefore may be better held for twisting or laying, titanium dioxide may be added to the mass prior to the extruding, drawing or rolling process whereby to deluster the resulting filaments. This matter of delustering the filaments does not apply when the strands or cores are in the form of single bar-like elements since in such instances there is no problem of holding a multiple of the filaments and twisting them about one another.

Having thus set forth the nature of my invention, what I claim is:

1. In a rope, a main core, a plurality of ropes laid helically about said main core, each of said ropes including a rope core and strands of metal and strands of plastic material laid helically about said rope core, a plurality of elements comprising each of said strands, each of said elements helically disposed in its strand, said elements, strands and ropes preformed into helices whereby to lie in neutral condition in said strands, ropes and about said main core.

2. A rope comprising metallic strands and flexible non-metallic strands intertwisted with said metallic strands, and each of said non-metallic strands comprising a bundle of filaments of a plastic material, the surfaces of which filaments have been treated to change their coefficient of friction.

3. A flexible composite rope including a plurality of composite strands formed of individual steel strands and strands of a resilient organic polymer, said steel strands each comprising a plurality of wires, said strands of a resilient organic polymer each comprising a bundle of mono-filaments, and said individual steel strands and strands of a resilient organic polymer arranged in alternate relation in said composite strands.

4. A flexible composite rope comprising a main mono-filament core of a resilient organic polymer, a plurality of composite strands laid about said core and each formed of individual steel strands and strands of a resilient organic polymer, said steel strands each comprising a plurality of wires, said strands of a resilient organic polymer each comprising a single filament, and said individual steel strands and strands of a resilient organic polymer arranged in alternate relation in said composite strands.

5. A flexible composite rope comprising a main core including a bundle of filaments of a resilient organic polymer, a plurality of composite strands laid about said core and each formed of individual steel strands and strands of a resilient organic polymer, said steel strands each comprising a plurality of wires, said strands of a resilient organic polymer comprising a bundle of filaments, and said individual steel strands and strands of a resilient organic polymer arranged in alternate relation in said composite strand.

6. A flexible composite rope comprising a core formed of a resilient organic polymer, individual steel strands and strands of a resilient organic polymer laid about said core, said steel strands each comprising a plurality of wires, and said strands of resilient organic polymer arranged in alternate relation with said steel strands about said core.

7. A flexible composite rope comprising a core formed of a resilient organic polymer, individual steel strands and strands of a resilient organic polymer laid about said core, said steel strands each comprising a plurality of wires, said strands of a resilient organic polymer each comprising a single filament of substantially the diameter of the steel strands, and said strands of resilient organic polymer arranged in alternate relation with said steel strands about said core.

8. A flexible composite rope comprising a core of a resilient organic polymer, individual steel strands and strands of a resilient organic polymer laid about said core, said steel strands each comprising a plurality of wires, said strands of resilient organic polymer each of substantially the diameter of said steel strands and each comprising a bundle of individually integral filaments, and said strands of resilient organic polymer arranged in alternate relation with said steel strands about said core.

9. A flexible composite rope comprising individual steel strands and strands of a resilient organic polymer, said steel strands comprising a plurality of wires, and said steel strands and strands of resilient organic polymer arranged in alternate relation in said rope.

10. A flexible composite rope comprising individual steel strands and strands of a resilient organic polymer, said steel strands each comprising a plurality of wires, said strands of resilient organic polymer each comprising a single filament of substantially the diameter of the steel strands, and said steel strands and strands of a resilient organic polymer arranged in alternate relation in said rope.

11. A flexible composite rope comprising individual steel strands and strands of a resilient organic polymer, said steel strands each comprising a plurality of wires, said strands of a resilient organic polymer each of substantially the diameter of said steel strands and each comprising a bundle of individually integral filaments, and said steel strands and strands of resilient organic polymer arranged in alternate relation in said rope.

12. A flexible composite rope comprising individual steel strands and strands of a vinyl compound, said steel strands each comprising a plurality of wires, said strands of a vinyl compound continuous for the length of the rope and each of substantially the diameter of said steel strands, and said steel strands and strands of vinyl compound arranged in alternate relation in said rope.

13. A flexible composite rope comprising individual steel strands and strands of vinylidene chloride, said steel strands each comprising a plurality of wires, said strands of vinylidene chloride continuous for the length of the rope and each of substantially the diameter of said steel strands, and said steel strands and strands of vinylidene chloride arranged in alternate relation in the rope.

14. A flexible composite rope comprising individual steel strands and strands of a resilient organic polymer, said steel strands each comprising a plurality of wires, said strands of a resilient organic polymer each comprising a bundle of filaments, and said wires and filaments preformed into helices whereby to lie in neutral condition in said strands.

15. A flexible composite rope comprising individual steel strands and strands of a resilient organic polymer, said steel strands each comprising a plurality of wires, said strands of a resilient organic polymer each comprising a bundle of filaments, and said strands preformed into helices whereby to lie in neutral condition in said ropes.

16. A flexible composite rope comprising individual steel strands and strands of a resilient organic polymer, said steel strands each comprising a plurality of wires, said strands of a resilient organic polymer each comprising a bundle of filaments, and said wires, filaments and strands preformed into helices whereby to lie in neutral condition in said strands and ropes.

17. In a rope, a main core, a plurality of ropes laid helically about said main core, each of said ropes including a rope core and strands of metal and strands of a vinyl compound laid helically about said rope core, a plurality of elements comprising each of said strands, each of said elements helically disposed in its strand, said elements, strands and ropes preformed into helices whereby to lie in neutral condition in said strands, ropes and about said main core.

18. In a rope, a main core, a plurality of ropes laid helically about said main core, each of said ropes including a rope core and strands of metal and strands of a vinylidene chloride polymer laid helically about said rope core, a plurality of elements comprising each of said strands, each of said elements helically disposed in its strand, said elements, strands and ropes preformed into helices whereby to lie in neutral condition in said strands, ropes and about said main core.

19. A flexible composite rope comprising individual steel strands and strands of a resilient organic polymer, said steel strands each comprising a plurality of wires, said strands of a resilient organic polymer comprising elongated filaments, and said strands preformed into helices whereby to lie in neutral condition in said rope.

20. A flexible composite rope comprising individual steel strands and strands of a resilient organic polymer, said steel strands each comprising a plurality of wires, said strands of a resilient organic polymer each comprising a monofilament of substantially the diameter of the steel strands, and said strands preformed into helices whereby to lie in neutral condition in said rope.

21. A flexible composite rope comprising individual steel strands and strands of a resilient organic polymer, said steel strands each comprising a plurality of wires, said strands of a resilient organic polymer comprising elongated filaments, said filaments having the characteristic of a fixed stretch under load, and said strands of steel and resilient organic polymer arranged in alternate relation.

RICHARD F. WARREN, Jr.